Dec. 24, 1963     R. S. WITKOFF     3,115,360
RESILIENT GRIPPING DEVICE
Filed Dec. 18, 1961
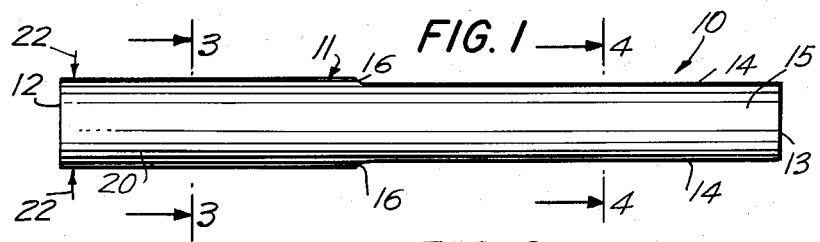
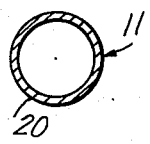
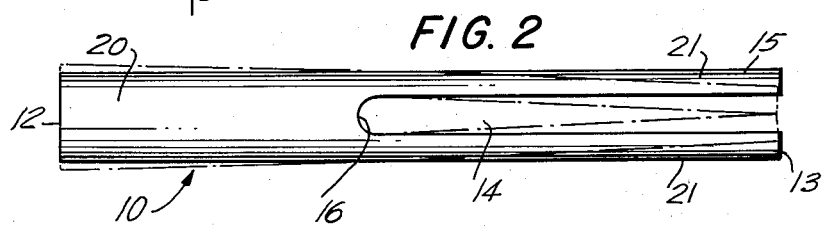
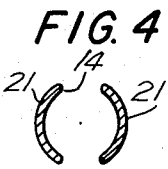
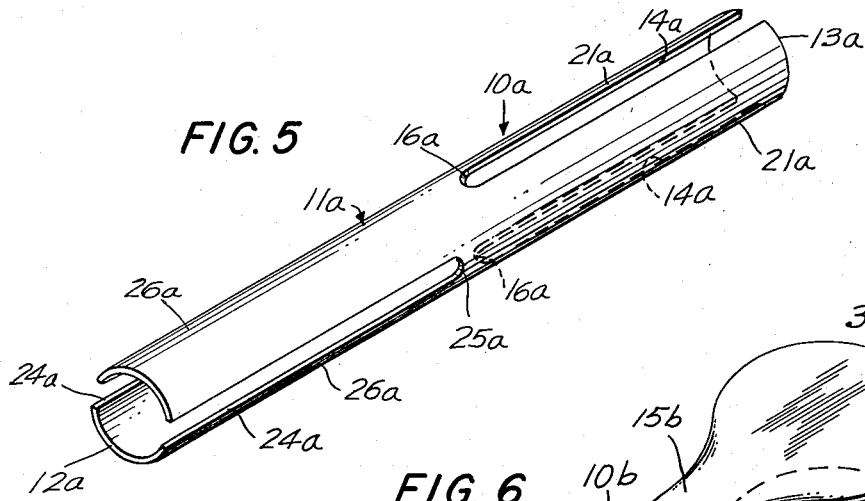
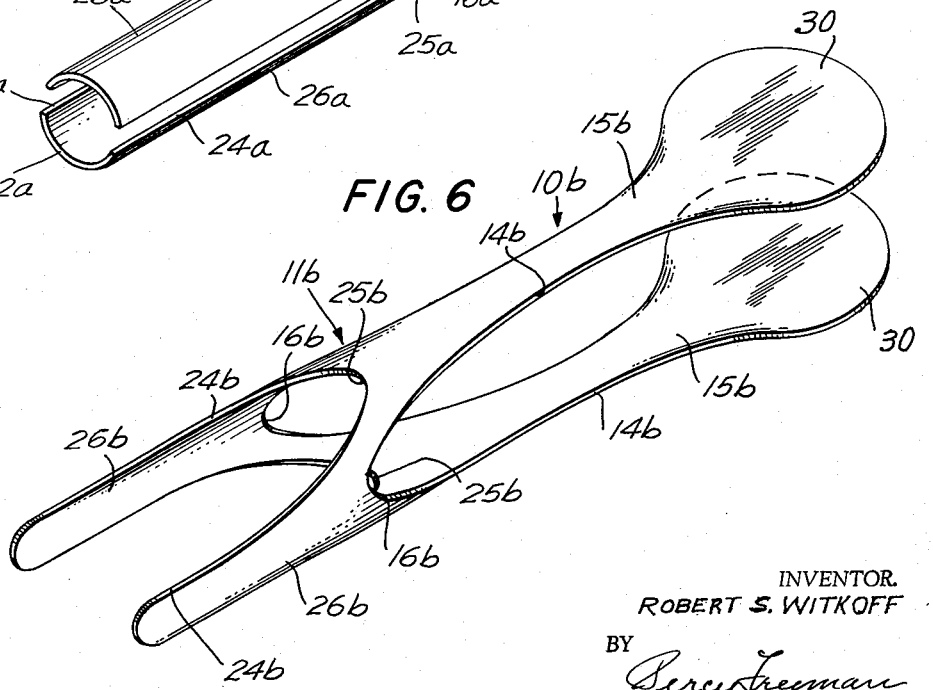
INVENTOR.
ROBERT S. WITKOFF
BY
*Percy Freeman*
ATTORNEY

3,115,360
RESILIENT GRIPPING DEVICE
Robert S. Witkoff, 136—89 71st Road, Flushing 67, N.Y.
Filed Dec. 18, 1961, Ser. No. 160—206
4 Claims. (Cl. 294—99)

This invention relates generally to a unique mechanical movement adapted for gripping or grasping action, say in the nature of tongs.

While the device of the present invention has been primarily developed and employed as tongs or gripping devices, and will be illustrated and described hereinafter with particular reference thereto, it is appreciated that the structure of the instant invention is capable of many varied applications, all of which are intended to be comprehended herein.

It is one object of the present invention to provide a gripping device in the nature of tongs, which is extremely simple in construction, and more durable and reliable than was heretofore possible, the entire device of the present invention being capable of fabrication from a single, integral piece of stiff resilient material, entirely without the use of pivots, fasteners, or relatively slidable parts.

It is another object of the present invention to provide a gripping or grasping device in the nature of tongs which is adapted for more sensitive and accurate control by an operator, the device having no backlash, slippage, friction, or the like, so as to be extremely useful in surgery, prosthesis, nuclear processes, similar and various other operations.

It is a further object of the present invention to provide gripping tongs having the advantageous characteristics mentioned in the preceding paragraphs, which are capable of the ultimate in sanitation and sterilization, especially as the instant device may be a single integral part having no cracks or crevices capable of collecting dirt and dust.

Another object of the present invention resides in the provision of a remote, manually actuable gripping or grasping device, wherein the gripping action is in a plane approximately ninety degrees from that of the manual operating motion, for enhanced convenience in many operations.

It is still a further object of the present invention to provide a gripping or grasping device of the type described which is staunch and sturdy in construction, for complete reliability in use, and which can be economically mass-produced for economy in cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 1 is an elevational view showing one embodiment of tongs constructed in accordance with the teachings of the present invention.

FIG. 2 is a plan view showing the device of FIG. 1.

FIG. 3 is a transverse sectional view taken substantially along the line 3—3 of FIG. 1.

FIG. 4 is a transverse sectional view taken substantially along the line 4—4 of FIG. 1.

FIG. 5 is a perspective view showing a modified embodiment of gripping device constructed in accordance with the teachings of the present invention.

FIG. 6 is a further embodiment of gripping device constructed according to the present invention.

Referring now more particularly to the drawings, and specifically to FIGS. 1-4 thereof, a gripping device is there generally designated 10, and may be integrally fabricated from a single piece of tubular stock, say of aluminum or other suitably stiff, resilient material. Thus, the device 10 includes a generally tubular body 11, which may be of generally circular cross-sectional configuration, but not necessarily so. The ends 12 and 13 may be open; and, a pair of diametrically opposed, longitudinally extending slots, cutouts or openings 14 may be formed in the end region 15 proximate to the end 13, extending longitudinally inward therefrom and each terminating at a location 16 spaced from the opposite end 12. The inner ends or termini 16 of the slots or openings 14 are preferably, but not necessarily, of rounded or arcuate configuration.

The end region 20 of the body 11 remains tubular; and, the diametrically opposed slots or cutouts 14 serve to define of the regions 21 between the slots a pair of extensions, tongues or legs 21 projecting generally longitudinally from the body region 20.

Upon the application of compressive force, as indicated by the arrows 22 in FIG. 1, against the end region 20, the legs 21 are caused to deflect inward toward each other, as shown in phantom outline in FIG. 2. More specifically, the compressive forces 22 are exerted generally coplanar with the diametrically opposed cutouts 14. The action of the compressive forces 22 spaced from the location 16 tends to flatten the upper and lower sides of the body region 20, as seen in FIG. 1, which, by the transverse arcuateness or curvature of the body tends to flex the region proximate to each location 16 and deflect the legs 21, causing their distal ends to move inward toward each other. Upon release of the forces 22, the legs 21 are free to move outward away from each other.

This may be readily understood by applying a compressive diametral force to one end of any somewhat stiff, resilient tube to slightly flatten, or cause to become oblate the compressed tube end region. Under this condition, it will be observed that the opposite tube end region is slightly oblate with its major axis disposed generally ninety degrees or normal to the major axis of the compressed end region. That is, the remote or uncompressed end region of the tube is oblate, having its major axis generally coplanar with the applied compressive force. Should slots be cut, corresponding to slots 14, coplanar with the applied compressive force, the legs defined by the slots, corresponding to the legs 21, will be more free to move toward and away from each other. This same physical action occurs in applying a compressive force to a stiff, resilient elongate non-tubular member of transversely arcuate configuration, such as semi-circular cross section so as to define a semi-cylinder.

A further development of the instant invention is shown in FIG. 5, the device there illustrated being generally designated 10a, and including a body 11a having ends 12a and 13a. A pair of diametrically opposed elongate cutouts, openings or slots 14a extend inward from the body end 13a and terminate at locations 16a. The body regions 21a located between the cutouts or openings 14a define generally parallel, longitudinally extending tongues or legs.

Extending inward from the body end 12a there are provided an additional pair of longitudinal slots, openings or cutouts 24a, which are diametrically opposed to each other and preferably located in a plane generally normal to the plane of slots 14a. The slots or openings 24a may extend inward from the body end 12a and terminate at locations 25a, short of or spaced from the end 13a. Further, the slots 24a may terminate short of or extend beyond the locations 16a, into the legs 21a, according to the desired degree of flexibility.

The body regions between the slots 24a may define legs or tongues 26a. The operation of the device 10a is similar to that described hereinbefore in connection with FIGS. 1–4, however, the additional slots 24a make the device more flexible and, therefore, more sensitive and responsive to a compressive force at one body end. For example, a compressive force tending to move the tongues or legs 26a toward each other would effect greater action of the legs 21a than the same compressive force applied in the first-described embodiment. While the slots 21a and 24a are shown as terminating short of each other, it is appreciated that they may be partially coextensive with each other, to achieve any desired degree of flexibility and responsiveness.

Still a further embodiment of the present invention is shown in FIG. 6, the device there generally being designated 10b, and including a body generally designated 11b. The body may be generally tubular and provided with a pair of diametrically opposed, longitudinally inwardly extending cutouts or openings 14b each terminating at a location 16b. The body material remaining between the cutouts 14b defines elongate legs or tongues 15b, which may have their distal end regions specifically configured to grip or grasp any desired object, being illustrated as of enlarged, somewhat flattened heads 30.

The other end of the body 11b is formed with a pair of cutouts or slots 24b extending longitudinally inward and terminating at respective locations 25b, beyond the locations 16b. The cutouts or slots 24b are in diametrically opposed relation with respect to each other, and disposed on a diametral plane generally normal to that of the cutouts 14b.

It is noted that the body regions defined between the cutouts 24b provide legs or tongues 26b, which in the instant embodiment are specifically configured for manual holding and squeezing to move the heads 30 toward and away from each other.

From the foregoing, it is seen that the present invention provides a mechanical movement in the nature of a gripping or grasping device which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described my invention, what I claim as new and desire to secure by Letters Patent, is:

1. A gripping device comprising a generally tubular body of stiff resilient material, said body having generally diametrically opposed cutouts extending inward from one end of said body and terminating short of the other end of said body to define a first pair of tongues, said body having a second pair of diametrically opposed cutouts spaced approximately 90° from said first pair of cutouts and extending inward from said other end of said body and terminating short of said one end of said body to define a second pair of tongues, said second pair of cutouts extending inwardly beyond the termini of said first pair if cutouts, whereby resilient compression and release of said second pair of tongues effects movement of said first pair of tongues toward and away from each other.

2. The gripping device of claim 1 wherein said second pair of tongues is configured for manual holding.

3. The gripping device of claim 2 wherein said first pair of tongues is configured for gripping a desired article.

4. The gripping device of claim 1 wherein said second pair of tongues is shorter than said first pair of tongues.

References Cited in the file of this patent

UNITED STATES PATENTS

| | | |
|---|---|---|
| 985,755 | Gilbert | Feb. 28, 1911 |
| 2,322,220 | Casselberry | June 22, 1943 |